Figure 1:
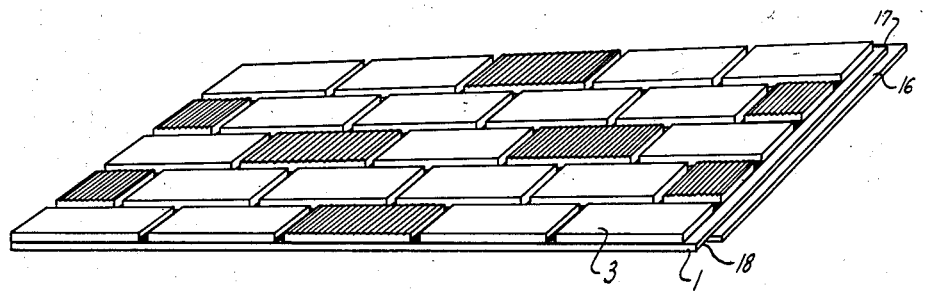

Jan. 18, 1944.　　　J. KUBLANOW　　　2,339,489
COMPOSITE BUILDING PANELS
Filed Feb. 11, 1941　　　3 Sheets-Sheet 1

INVENTOR.
Joseph Kublanow
BY William B. Jaspert
Attorney.

Jan. 18, 1944.    J. KUBLANOW    2,339,489
COMPOSITE BUILDING PANELS
Filed Feb. 11, 1941    3 Sheets-Sheet 3

INVENTOR.
Joseph Kublanow
BY William B. Jaspert
attorney.

Patented Jan. 18, 1944

2,339,489

UNITED STATES PATENT OFFICE 2,339,489

COMPOSITE BUILDING PANEL

Joseph Kublanow, Pittsburgh, Pa.

Application February 11, 1941, Serial No. 378,357

2 Claims. (Cl. 154—2)

This invention relates to new and useful improvements in composite building wall panels and a method of making the same.

It is among the objects thereof to provide a wall panel of a composite structure having a facing material in the form of individual cut-out slabs attached thereto, to simulate brick or stone.

Heretofore, composite wall panels have been formed of fibrous material coated with a mastic material having crushed refractory particles sprinkled thereon, and having motor joints embossed therein.

By employing a base material of suitable insulating and weatherproofing properties and mounting a surfacing material of a different color and more weather-resisting properties on one side thereof, a product of superior quality and better appearance can be produced.

Figure 2:
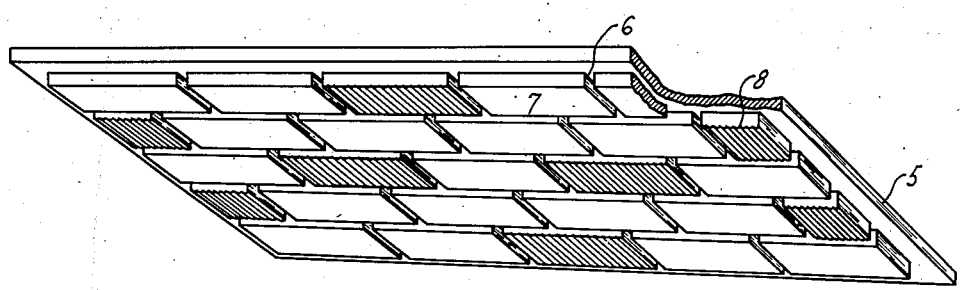
Figure 3:
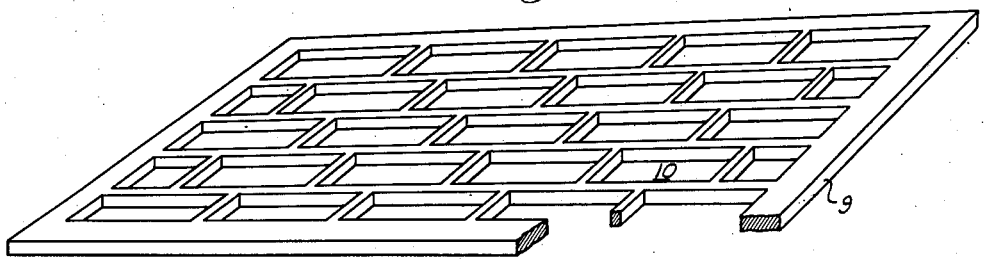
Figure 4:
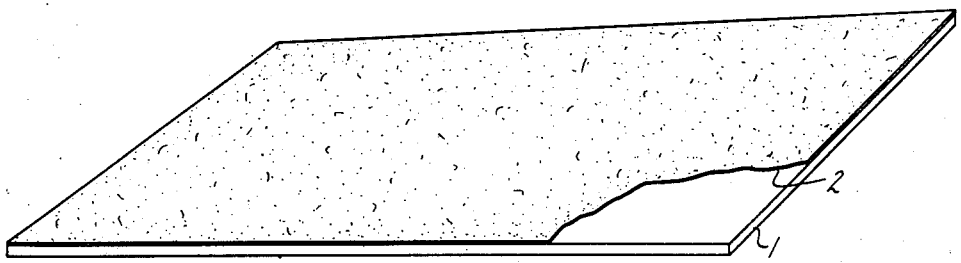
Figure 5:
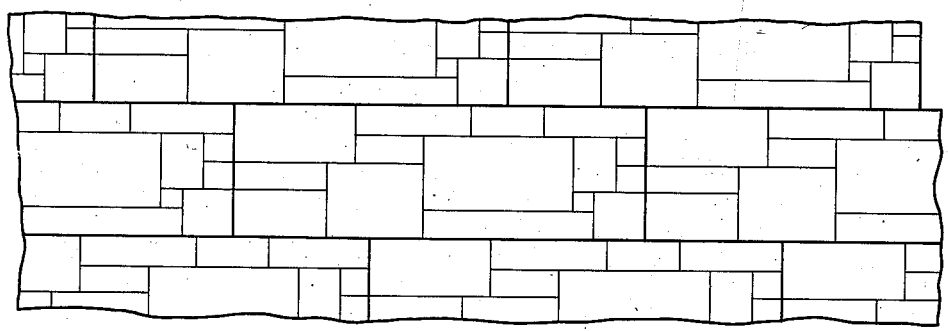
Figure 6:
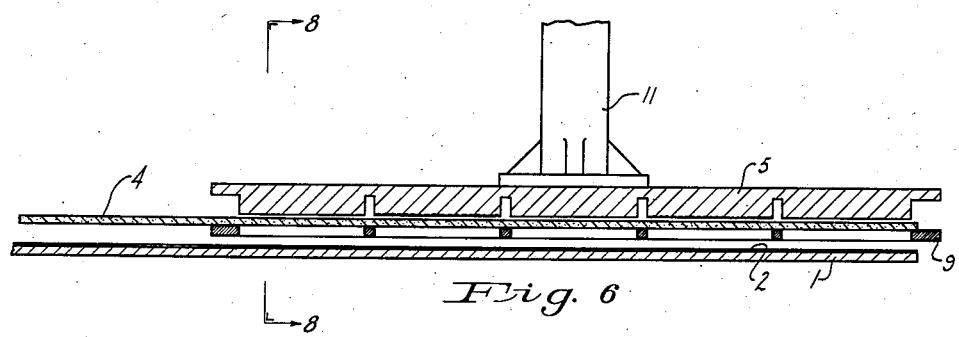
Figure 7:
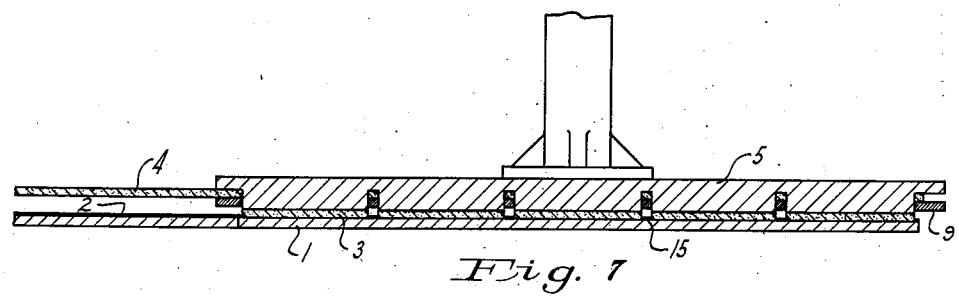
Figure 8:
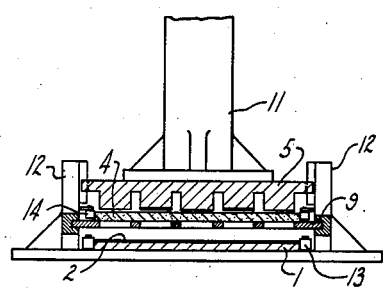
Figure 9:
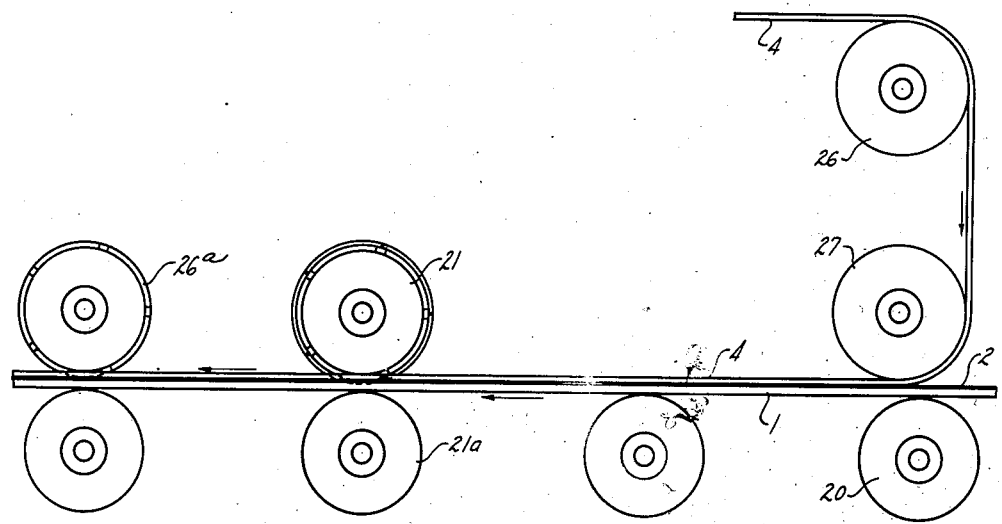
Figure 10:
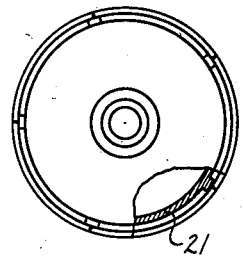
Figure 11:
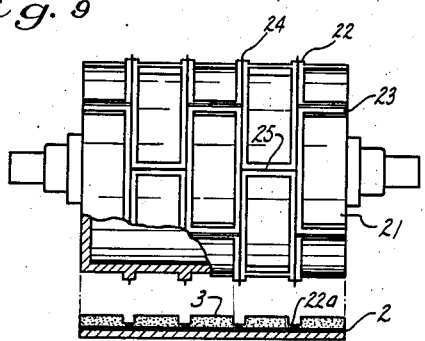
Figure 12:
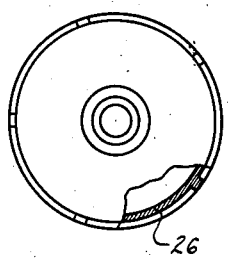

The invention will become more apparent from a description of the accompanying drawings constituting a part hereof in which like reference characters designate like parts, and in which:

Fig. 1 is a view in perspective of a building wall panel embodying the principles of this invention;

Fig. 2 a view in perspective of a combined punching die and pressure plate;

Fig. 3 a view in perspective of a female die;

Fig. 4 a view in perspective of a base board of which the panel is formed;

Fig. 5 a side elevational view of a portion of a wall employing panels simulating stone;

Fig. 6 a vertical cross-section of a panel board and male and female die, and sheet material from which the surface material is formed;

Fig. 7 a similar view;

Fig. 8 a vertical cross-section taken on the line 8—8, Fig. 6;

Fig. 9 a side elevational view diagrammatically illustrating a method of forming building wall panels in accordance with the present invention by continuous process;

Fig. 10 an end elevational view partially cut away of a cutting die;

Fig. 11 an exploded view partially in section and partially in front elevation of the assembled panel and the forming and cutting roll;

Fig. 12 an end elevational view of a combined pressure and heating roll; and

Figure 13:
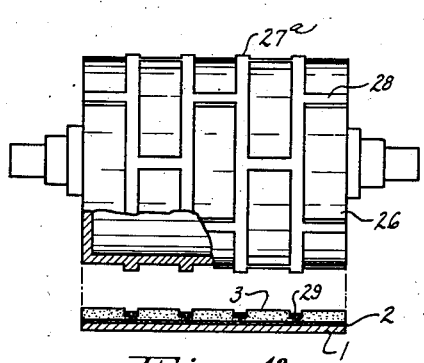

Fig. 13 an exploded view of the finished panel in cross-section and the pressure and heating roll in front elevation partially cut away.

With reference to Figs. 1 to 8 of the drawings, the numeral 1 designates the base board which may be compressed fibrous material treated with a weatherproofing compound, and the numeral 2 designates a layer of mastic material such as asphalt or other adhesive substance made of a neutral or synthetic resin or glue. The numeral 3, Fig. 1, designates rectangular slabs which have been punched from sheet 4, as shown in Figs. 6 and 7. The sheet material 4 may be any material of a non-metallic base that is preferably of a character to be formed in sheets, as the sheet 4, so that when acted upon by a punch or cutting die, it will shear and be deposited on the adhesive material 2.

As shown in Figs. 2 and 3, a combined punch and forming die consisting of a platen 5 having slots 6 dividing it into block 7, some of which are provided with serrations or grooves 8, is adapted to cooperate with a punch block 9 having spaces 10 corresponding to the block 7 of the male die member. These are mounted in a press, as shown in Figs. 6 to 8, in which the platen 5 is secured to a movable frame or ram 11, and the punch block 9 is mounted in side frames 12.

The base material 1 is fed into the press between guide rollers 13 with the mastic 2 applied to the upper surface thereof. The sheet material 4 is fed between the platen 5 and punch block 9 between guide rollers 14, and by lowering the ram or frame 5 the blocks 3 are punched out of the sheet 4 through the punch block 9 and deposited on the mastic material 2 of the base sheet 1, this operation being shown in Figs. 6 and 7.

As appears from Fig. 7, the platen 5 not only acts to punch out the blocks or slabs 3, but presses the same into the adhesive substance which flows between the blocks, as shown at 15, Fig. 7. By employing an adhesive material 2 of a suitable color, different from the color of the slab, the material flowing in the joints 15 produces a contrast simulating mortar joints between the slabs or stone, as the case may be.

By making the slab material 3 in color of asbestos or other fibers or fillers, with a suitable binder such as magnesium cement or a plastic resin, highly ornamental effects are obtainable, and various color effects may be thus produced.

The corrugations 8 of the punch block 5 form serrations having the appearance of a rough surface cutting on some of the slabs, as appears from the panel of Fig. 1.

The stone effect may be produced in various colors by passing the panel under a series of dies, blocking out different colored materials forming a staggered color effect in the finished panel.

As shown in Fig. 1, the edges of the base panel 1 are cut away to form shoulders 16 on the ends, shoulders 17 at the upper side, and is similarly cut away on the opposite side of the panel to form a shoulder 18 and a shoulder on the end opposite the shoulder 16, so that by joining the panels with their shoulders abutting, proper spacing of the slabs 3 is maintained in the assembled wall.

Still another method of producing the composite panel described in Figs. 1 to 8 inclusive is illustrated in Figs. 9 to 13 of the drawings, and will now be described.

The base panels 1, having been coated with a mastic material 2, Fig. 9, are fed over a plurality of roll conveyors 20 to a combined forming and cutting drum 21 shown in Figs. 10 and 11. This drum may or may not be heated on the interior thereof. It is provided with annular and longitudinal projections 22 and 23, respectively, on which are mounted cutting blades 24 and 25. The sheet material 4 from which the slabbing is made is fed from the treating and drying apparatus over guide rolls 26 and 27, the latter acting to press the sheet 4 on the mastic material 2. The joined sheets then pass between the forming and cutting drum 21 and a supporting drum 21a, the members 22 and 23 forming longitudinal and transverse grooves 22a and 23a. The cutting knives 24 cutting through the sheet 4 into the mastic material 2 are shown in Fig. 11. The grooved and slotted material then passes into a heated pressure roll 26a shown in Figs. 12 and 13, the drum 26 having annular and transverse projections 27a and 28 corresponding to the projections 22 and 23 of drum 21.

Roll 26 is heated by steam or gas flame on the interior thereof and acts upon the sheet material passing therebeneath to further press the slabs 3 into the mastic substance 2, and by the pressure and heat causes the mastic material 2 to flow through the slots formed by the cutting blades 24 into the grooves, partially filling the grooves as shown by the numeral 29, Fig. 13.

Here again, by using contrasting materials, a mortar joint effect is produced.

Although several embodiments of the invention have been herein illustrated and described, it will be evident to those skilled in the art that various modifications may be made in the details of construction without departing from the principles herein set forth.

I claim:

1. The method of making composite building wall panels which consists in coating one surface of a sheet material with a thermoplastic adhesive material, joining a surface sheet to said adhesive material, subjecting the joined sheets to external pressure, embossing grooves in said surface sheet material to simulate joints of building blocks and perforating the surface material and simultaneously heating the same to cause the adhesive material to flow through the perforations of the surface material to cover the base of the grooves formed therein.

2. The method of forming composite building wall panels which comprises coating a surface of a sheet material with a thermoplastic adhesive material, applying a surface sheet to said adhesive material, subjecting the joined sheet materials to external pressure, embossing longitudinal and transverse grooves in the surface material to simulate building blocks, perforating the grooves in said surface material and subjecting said embossed sheet to the action of heat and pressure to initially cause the adhesive material to flow through the perforations in the grooves of the surface material and finally fuse said adhesive material to a solid state.

JOSEPH KUBLANOW.